United States Patent [19]
Smith et al.

[11] 3,771,663
[45] Nov. 13, 1973

[54] HIGH SURFACE AREA TO COMPARTMENTAL VOLUME DIFFUSION AND DIALYSIS CELL

[75] Inventors: Edwin W. Smith, Climax; Gordon L. Flynn, Kalamazoo, both of Mich.

[73] Assignee: The Upjohn Co., Kalamazoo, Mich.

[22] Filed: Apr. 30, 1971

[21] Appl. No.: 139,166

[52] U.S. Cl. .................................. 210/321, 210/433
[51] Int. Cl. .................................. B01d 31/00
[58] Field of Search .................................. 210/22, 23, 321, 210/433

[56] References Cited

UNITED STATES PATENTS

| | | | |
|---|---|---|---|
| 3,276,996 | 10/1966 | Lazare | 210/22 |
| 3,562,152 | 2/1971 | Davison | 210/22 |
| 3,645,891 | 2/1972 | Goldup et al. | 210/23 |

*Primary Examiner*—Frank A. Spear, Jr.
*Attorney*—Woodhams, Blanchard and Flynn, John Kekich and Ward F. Nixon

[57] ABSTRACT

Apparatus for a diffusion cell system wherein variables are under a high level of control. The invention provides a diffusional cell having a high ratio of membrane surface to cell volume and in which the medium containing liquid is caused to sweep the membrane in a directional movement parallel to the plane of the membrane. The invention is based on the appreciation that at least in some instances the dominant variable in the operation of the diffusion cell is the so-called diffusion layer and accordingly uniform and repeatable results are obtained by establishing conditions under which the thickness of the diffusion layer can be accurately controlled.

16 Claims, 4 Drawing Figures

PATENTED NOV 13 1973 3,771,663

SHEET 1 OF 2

HIGH SURFACE AREA TO COMPARTMENTAL VOLUME DIFFUSION AND DIALYSIS CELL

FIELD OF THE INVENTION

This invention relates to a diffusion cell system and particularly to one obtaining a high level of accuracy and control and particularly by accurately controlling the thickness and other characteristics of the stagnant layers of liquid contiguous to each side of the diffusion membrane, commonly termed the diffusion layers. Particularly, the diffusion layer is controlled, and these results are obtained, by providing an agitator, preferably on each side of the membrane, which substantially fills the corresponding side of said cell and further by causing said agitator to move through a region lying close to said membrane and in a direction parallel to the plane of said membrane. Furthermore, a low ratio of cell volume to membrane area is provided, substantially improving the sensitivity of the system in any continuously monitored diffusion run.

BACKGROUND OF THE INVENTION

Diffusion cell systems have been known for a long period of time and same have embodied a wide variety of arrangements and organization. Insofar as I am aware, however, no prior diffusion cell, either in use or reported in the literature, has had physical characteristics enabling it to proceed under sufficiently exact control as to enable experiments performed therewith to be repeatable or even, if necessary, to permit experiments partially performed at one time to be effectively continued at a subsequent time.

More particularly, diffusion cell systems have been known which provide means defining a first chamber of known volume and further means defining a second chamber of known volume and means for clamping a diffusion membrane tightly therebetween. However, in some of these cell systems the agitation is provided by a magnetically agitatable bar loosely disposed in the cell and moveable therein without positive constraint on its path of motion. In others of prior cell systems, agitation is provided by an impeller on a shaft merely extending through the mouth of a flask, the lower portion of which comprises the chamber at one side of the membrane. In all of these known prior devices, the relationship between the agitator and the surface of the membrane is either so casual or so distant or both that the sweep of liquid across the membrane produces a variable diffusion layer, same being not only variable from one operation to another but often variable from moment to moment in a given operation.

In the past it has been recognized that experiments involving diffusion cells were often of a very critical nature and it has been further recognized that in many instances the repetition of an experiment on apparently similar but actually different equipment was often impossible. Nevertheless the prior art failed to realize the reason for discrepancies in experimental results obtained from different cell systems or even the same cell system at different times.

In working with this problem we have utilized and developed the fact that the resistance $R$ of a continuous diffusion membrane (where $R$ may be defined as the reciprocal of the permeability of the membrane) may be expressed by the following equation:

$$R = (2T_{dl}/D_s) + [(T_m/(PC)D_m)]$$

Wherein $T_{dl}$ = thickness of the diffusion layer $D_s$ = diffusion coefficient of solvent (donor liquid)

$T_m$ = thickness of the membrane $PC$ = partition coefficient $D_m$ = diffusion coefficient of the membrane While with solutes (material to be transferred) which are organic compounds having a relatively low carbon number no great difficulty in experiment repeatability is experienced, as the carbon number of such compounds is increased the partition coefficient $PC$ increases logarithmically. This being true, the second term on the right hand side of the above equation very soon becomes such an extremely small value that it, and consequently the values represented therein, have relatively little effect on the value of $R$. Since the diffusion coefficient of water remains essentially constant, this means that the thickness of the diffusion layer very quickly, as the carbon number of the compound increases, becomes the dominant item in determining the value of $R$. Thus, in order to obtain a diffusion cell system having a sufficiently constant value for R to be capable of giving controllable and/or predictable results, we have appreciated, for the first time insofar as we are aware, that it is essential to provide a diffusion cell wherein the thickness of the diffusion layer is kept under close, accurate and constant control and, further, that to do so will provide the desired repeatable results.

Accordingly, the objects of this invention include provision of:

1. A diffusion cell system in which variables and particularly the thickness and configuration of the diffusion layer are under a high level of control.

2. A diffusion cell system, as aforesaid, which provides a high level of repeatability in experimental results and hence contributes to a high degree of reliability of experimental results.

3. A diffusion cell system, as aforesaid, in which the diffusional area is maximized and the diffusional volume is minimized and in which the sensitivity is maximized by provision of a high surface area to volume ratio.

4. A diffusion cell system, as aforesaid, in which synchronized and precisely controlled stirring is provided, in which stirring motion is parallel to the plane of diffusion and in which components of motion of the liquid in direction transverse to the plane of diffusion are at least minimized and are substantially eliminated.

5. A diffusion cell system, as aforesaid, incorporating provision for closely regulating the temperature of the liquids in the diffusion cell, in which the diffusion cell is substantially totally immersable in and readily removeable from a constant temperature bath, in which the assembled cell provides a large heat sink mass to assist maintenance of uniform and constant operating temperature, and in which the liquid bath provides the lubrication and heat stability for a gear train driving the means for agitating the liquid within the cell.

6. A diffusion cell system, as aforesaid, in which the cell can be quickly and readily assembled or disassembled without the use of tools, in which the diffusion membrane and agitating means are readily removable and replaceable, in which the two halves of the diffusion cell are held together and sealed continuously about the periphery thereof, in which contact pressure of the two halves is uniform around the periphery thereof, in which assembly or disassembly of the cell can be effected by manipulation of a single fastening device and in which skewing of the membrane is prevented during assembly of the two cell halves together.

7. A diffusion cell system, as aforesaid, in which the membrane surfaces are not interupted by an impeller shaft, in which the cell halves may independently be used with or without impellers or with impellers of different sizes and configurations and in which impellers within the two cell halves may be operated at different though precisely controlled speeds or at the same speed.

8. A diffusion cell system, as aforesaid, which provides self-clearing of entrapped air, which permits ready entrance to each cell half during test runs and which provides for a controlled flow of liquids for each cell half, which flow may be fixed or variable or may be continuous or discontinuous as desired during test runs.

Other objects and purposes of the invention will be apparent to persons acquainted with apparatus of this general type upon reading the following specification and inspecting the accompanying drawings.

SUMMARY OF THE INVENTION

In meeting the problem dealt with by this invention as set forth above, we have provided a diffusion cell having a pair of cylindrical chambers positioned end-to-end with a diffusion membrane clamped tightly therebetween. A clamping means is arranged to provide clamping force uniformly throughout the entire circumference of the membrane thereby assisting to hold same in a uniform manner. An agitator shaft extends through a suitable liquid seal into at least the donor side of the cell system. An agitator is placed for rotation with said shaft, the volume thereof being carefully selected with respect to the empty volume of the chamber occupied thereby so as to provide an exact control over the effective chamber volume as compared to the area of the membrane. Further, the agitator is caused to run close to the surface of the membrane thereby causing liquid material moved thereby to pass across said membrane in a uniform manner. Further, by placing the agitator close to the surface of the membrane, the zone through which the diffusion layer can fluctuate is minimized and hence said diffusion layer is maintained at a uniform thickness and constant shape both during a given operation as well as from one operation to another.

Similarly, if desired, another agitator shaft can extend through a suitable seal into the other chamber and be fitted with an appropriate agitator as desired, which agitator may be and often is identical with that provided for the donor chamber.

DETAILED DESCRIPTION

Although described largely in terms of use in diffusion processes, it will be understood that the apparatus of the present invention is usable in connection with dialysis as well.

Figures 1, 2:
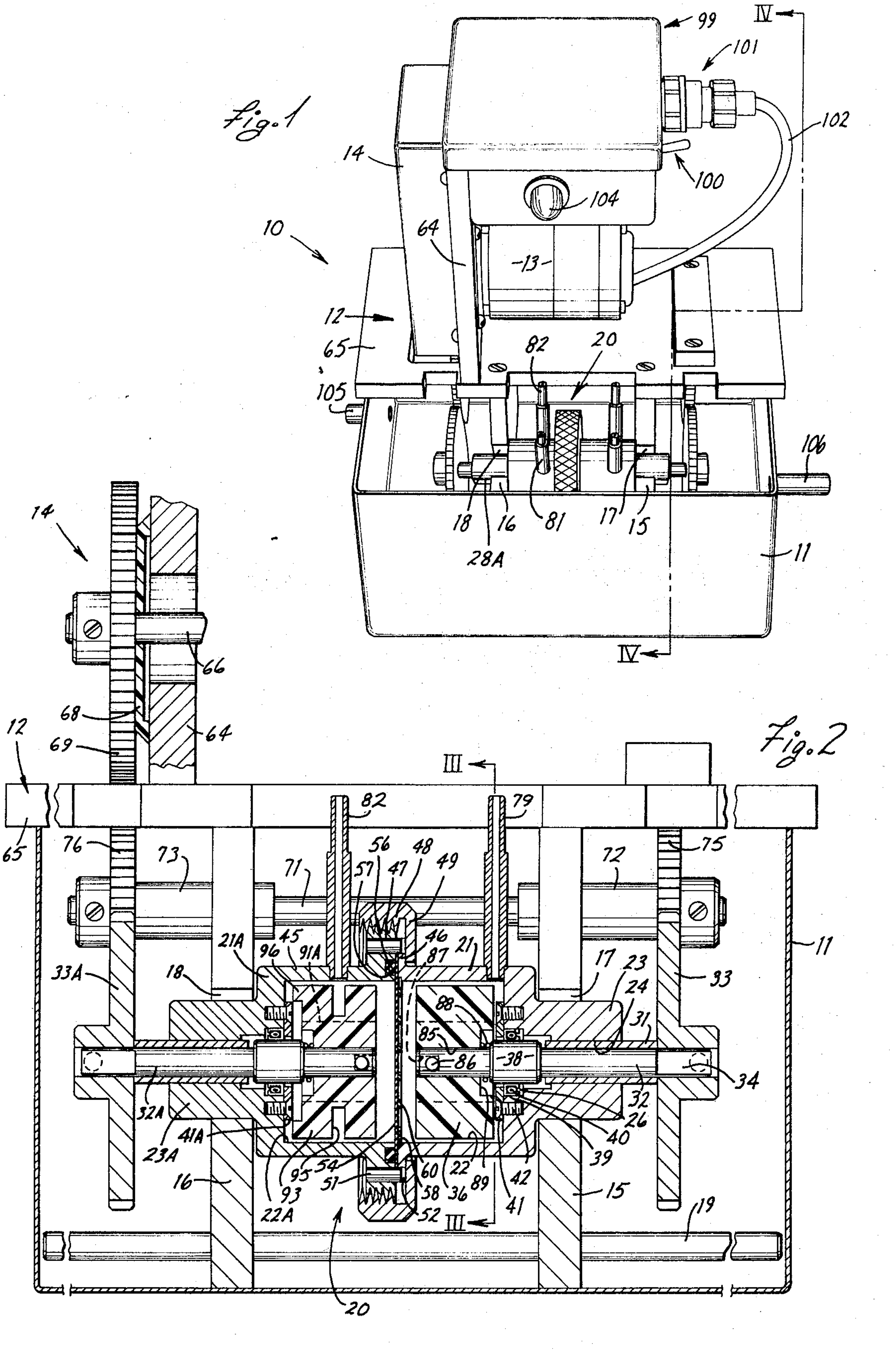
FIG. 1 is a pictorial view showing the front and top of a diffusion cell system embodying the invention.
FIG. 2 is an enlarged, partially broken central cross-sectional view through the diffusion cell, taken substantially along the line II—II of FIG. 4.

Referring first to FIG. 1, there is shown a diffusion cell system 10 comprising receptacle 11 having at least a partial cover 12 which supports both a motor 13 and power transmission means 14 driven thereby. The latter, in this instance, preferably includes a portion of a gear train hereinafter described. A pair of upstanding brackets 15 and 16 are provided within the receptacle 11 and are provided with substantially upwardly opening and rectangular recesses 17 and 18, respectively. Said recesses are provided for reception of a diffusion cell 20 as hereinafter described. The brackets 15 and 16 are rigidly connected by a pair of tie rods 19 (FIGS. 2 and 4) at their lower ends and fixedly though removably support the cover 12 at their upper ends.

Referring now to FIG. 2, the rightward portion of the diffusion cell 20 includes a leftwardly opening, generally cup-shaped housing 21 defining a preferably circular and cylindrical chamber 22 therewithin. A hollow cylindrical bearing and sealing extension 23 extends coaxially outwardly from the cup-shaped portion of the housing 21 and has a central opening 24 communicating with the chamber 22. The central opening 24 has at the inner end thereof at least one relieved or radially enlarged recess 26 for purposes appearing hereinafter. The peripheral wall of the extension 23 is provided with a pair of diametrically opposed flats 28 (FIG. 4) for snug and slideable engagement with the opposed faces of the recess 17 in the adjacent bracket 15, the coaction of the flats 28 and recess 17 determining the circumferential orientation of the housing 21 when supported by the bracket 15.

A suitable bearing 31, here an elongated sleeve bearing, is coaxially fixed within the central opening 24 of the extension 23. The bearing 31 preferably extends from a location spaced axially outwardly from the recess 26 to a point spaced axially outwardly beyond the end of the extension 23.

An impeller shaft 32 extends through and is rotatably supported by the bearing 31. The inner end of the shaft normally extends into the chamber 22 to a point somewhat inwardly spaced from the open end of such chamber. The axially outer end of the shaft 32 normally extends beyond the bearing 31. The outer end of the shaft 32 is adapted to fixedly carry a driven gear 33, preferably affixed to the shaft by means of a set screw engaging a flat 34 on the outer end of the shaft 32. The inner end of the shaft 32 carries an agitator or impeller 36 described in more detail hereinater and located within the chamber 22.

In the particular embodiment shown, a radially enlarged and preferably circularly cylindrical boss 38, preferably integral with the shaft 32, is disposed intermediate the ends of the shaft and is normally disposed with its peripheral surface in radial opposition to the recess 26. An annular seal 39, preferably a cup-shaped seal of teflon impregnated with graphite, is disposed in the recess 26 and sealingly surrounds the shaft 32. A retainer plate 41 of annular configuration loosely surrounds the shaft 32 and radially inwardly overhangs the recess 26 for retaining the seal 39 axially therewithin. A coil spring 40 lies within the cup-shaped seal 39 and also surrounds the shaft 32 for forcing the axially extending legs of the seal resiliently away from each other and in sealing relation against the radially opposed faces of the shaft boss 38 and recess 26. The retainer plate 41 is secured to the end wall of the chamber 22 by any convenient releasable means such as screws 42.

The gear 33 is preferably located axially on the shaft 32 in such manner that the bearing 31 is closely sandwiched between such gear 33 and the boss 38 so as to positively axially locate the shaft 32 with respect to the housing 21.

A generally similar and opposed cup-shaped housing 45 is provided to coaxially mate with the housing 21 and is similarly provided with an impeller shaft, bearing, seal, retainer plate and driven gear, all preferably identical to the corresponding parts above described in connection with the housing 21 and referred to hereinafter by the same reference numerals used above in connection with housing 21 with the suffix "A" added thereto. Such parts associated with the housing 45 thus require no further description.

The opposed housings 21 and 45 are provided with opposed radially outwardly extending flanges 46 and 47, respectively. One of said flanges, in the particularly embodiment shown the flange 47, extends outwardly beyond the other flange 46 and is externally threaded for threaded engagement by a surrounding, externally threaded nut 48. The nut 48 includes an inwardly extending radial flange 49 which overhangs the flange 46 for uniformly urging the housing flanges 46 and 47 axially together upon tightening the nut 48.

Axial pins 51 are fixed to the flange 47 and extend rightwardly therefrom a sufficient distance to locate within and engage radially outwardly opening notches in the flange 46 for coaxially locating the housings 21 and 45 and for facilitating assembly thereof in correctly aligned relationship.

A diffusion membrane 54 extends radially across the open ends of the housings 21 and 45 and radially overlaps the flanges 46 and 47, the diffusion membrane 54 being tightly clamped between the flanges 46 and 47 upon tightening of the nut 48. A seal, preferably an O-ring seal, 56 is disposed in an annular and axially opening recess in and coaxial with one of the flanges 46 and 47, here the flange 47. The seal 57 is compressed upon tightening of the nut 48 and thus bears resiliently against the membrane 54 and against the flange 47 and causes the membrane in turn to bear resiliently against the flange 46 to effect a seal preventing leakage from the chambers 22 and 22a radially and outwardly therepast.

The open end of one of the housings 21 and 45, here the housing 21, is annularly recessed as indicated at 58 for receiving a perforate membrane backing disk 60, held fixedly in place by tightening of the nut 48 and lying in backing contact with the membrane. The backing disk 60 serves to control, by means of the distribution and size of the holes therethrough, the exposed area of the membrane 34 used in diffusion from the housing 21 to the housing 45 and also serves to back the membrane 54.

Thus, by suitably positioning the parts and tightening the circumferential nut 48, the seal 56 and the diffusion membrane 54 are clamped tightly yet uniformly between the facing flanges 46 and 47 of the respective cup-shaped housings 21 and 45.

The membrane 24 can be of any kind at all as to thickness, material or other characteristics desirable for a diffusion cell system. In some of the experimental work resulting in the present invention, the membranes used were of a silastic material arranging in thickness from 0.005 inch to 0.020 inch.

The power transmission means 14 for rotating the gears 33 and 33A may be of any convenient nature but is preferably, for reasons of exact speed control, positive rather than frictional in type. In the particular embodiment herein set forth, the motor 13 (FIG. 1) is mounted on and extends rightwardly from a plate 64 fixed to and upstanding from the base plate 65 of the cover 12. The shaft 66 of the motor 13 extends leftwardly, as seen in FIG. 2, loosely through the upstanding plate 64 and has affixed thereto a slinger disk 68 and drive gear 69. The motor 13 is preferably secured to the plate 64 by means such as screws to allow rapid motor replacement, for example, as a way of conveniently obtaining different operating speeds for the impeller shafts 32 and 32A.

A countershaft 71 is rotatably supported by bearings 72 and 73 carried by the brackets 15 and 16 above and behind the cell 20. The ends of the countershaft 71 support intermediate gears 75 and 76 continuously engageable with the driven gears 33 and 33A, respectively, the gear 76 also engaging the drive gear 69. Thus, the motor 13 drives the drive gear 69 which in turn simultaneously drives the gear 76 and therethrough the gear 33A and shaft 71. Said shaft then drives the gear 75 which drives the gear 33. Depending on the gear ratios chosen for the gears 76 and 33A as compared to the gears 75 and 33, any desired ratio may be obtained and precisely maintained between the speeds of the shafts 32 and 32A. Also, the drive-intermediate and intermediate-driven gear ratios may be varied for changing the speeds of the shafts 32 and 32A.

The housing 21 is provided with an inlet conduit 78, an outlet conduit 79 (FIGS. 2 and 3) both of which communicate through the peripheral wall of the housing 21 with the closed end of the chamber 22. The outlet conduit 79 preferably communicates with the chamber 22 at the top thereof in order that any bubbles which may be entrained in the liquid within the chamber 22 can be immediately expelled through the outlet conduit 79. The inlet conduit may be spaced circumferentially away from the outlet conduit 79 by any convenient distance but it is preferably relatively closely located thereto and preferably extends from the peripheral wall of the housing 21 at a point near the top thereof for allowing convenient access thereto. The inlet and outlet conduits 78 and 79 are adapted to connect to the supply and return sides, respectively, of a source of donor liquid (not shown) such as through suitable tubing (not shown). The donor liquid may be of any desired nature and normally includes a material which is to be transported from the chamber 22 to the chamber 22*a* through the membrane 54. Provision of the inlet and outlet conduits 78 and 79 allows such donor liquid to be easily cycled at a desired rate through the chamber 22 during the diffusion process and alternatively allows the chamber to be merely initially filled with donor liquid through the conduit 78, allowing air and other gases to escape through the conduit 79, where it is desired to diffuse materials from a fixed amount of donor liquid located substantially entirely within the chamber 22. In the latter instance, the open ends of the conduits 78 and 79 can, after filling of the chamber 22 with donor liquid, be connected by a suitable piece of tubing (not shown) for providing a closed path through the conduits, tubing and chamber. The inlet and outlet conduits 78 and 79 are located adjacent the closed end of the chamber 22 to maintain same as distant as possible from the membrane 54 so that any flow through the conduits 78 and 79 during the diffusion process will not materially degrade the flow condition at the membrane and hence the diffusion layer and, for example, will minimize the effect at the membrane of any tendency of flow through the inlet and outlet conduits to produce flow components transverse to the plane of the membrane.

The chamber 22A is, in the particular embodiment shown, provided with inlet and outlet conduits 81 and 82 which are preferably identical to the conduits 78 and 79 above described. The conduits 81 and 82 are located on the housing 45 in a manner which is preferably a mirror image of the location of the conduits 78 and 79 on the housing 21, except that the conduits 80 and 81, in the particular embodiment shown, extend through the peripheral wall of the housing 45 at a point intermediate the membrane and the closed end wall thereof and are spaced from, rather than being closely adjacent, the closed end wall of the chamber 22*a*. In a manner similar to that described above with respect to the conduits 78 and 79, the conduits 81 and 82 are connectable respectively to the inlet and outlet of a source of acceptor fluid which is to receive material transported through the membrane 54 from the donor liquid in the chamber 22. Again, the acceptor chamber 22A may be operated during the diffusion process in continuous connection to such source of acceptor liquid or may be operated after filling in a closed condition with a connecting tube (not shown) between the conduits 81 and 82.

Figure 4:
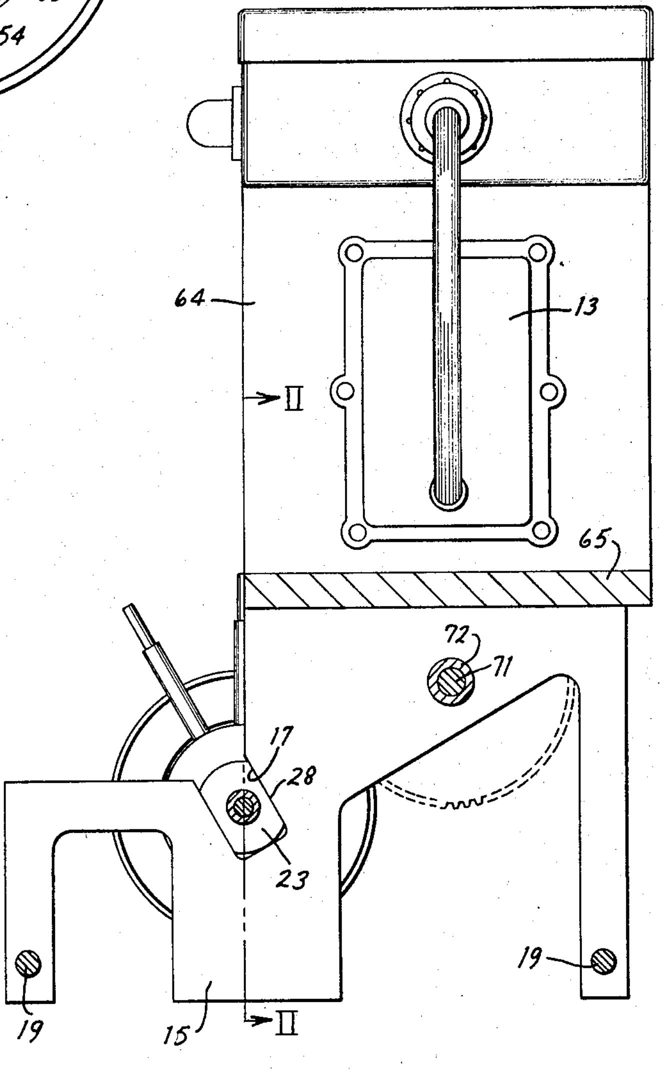
FIG. 4 is an enlarged sectional view taken on the line IV—IV of FIG. 1.

Referring to FIG. 4, it will be observed that the sidewalls of the notches or recesses 17 and 18 are not vertical but are slightly slanted upwardly away from the countershaft 71 in a manner that the diffusion cell 20 may be easily dropped into said notches 17 and 18, with the gears 33 and 33A falling readily into mesh with the countershaft gears 75 and 76. Likewise said diffusion cell unit may be removed from the brackets 15 and 16 merely by manually lifting it out of said notches.

To facilitate control of the operating temperature of the diffusion cell 20, the receptacle 11 is made watertight to a sufficient depth as to enable filling thereof with a temperature control liquid, such as water, to a depth above the the cell 20 but below the level of the exposed ends of the conduits 78, 79, 81 and 82. The temperature control liquid may be cycled through the container 11 by means of conventional, hollow fluid connectors 105 and 106 coupled through the walls of the receptacle 11, preferably adjacent opposite corners thereof as seen in FIG. 1.

It will be noted that the flats 28 and 28A of the diffusion cell 20 are angled with respect to the inlet and outlet conduits 78, 79, 81 and 82 so that when the extensions 23 and 23a are disposed in the notches 17 and 18 as shown in FIGS. 1, 2 and 4, the outlet conduits 79 and 82 will be substantially vertical and the inlet conduits 78 and 81 will be angled upwardly and somewhat toward the front face of the container 11 whereby ready access may be had to the exposed ends of such conduits for purposes of connecting same to fluid sources as aforementioned.

Considering in more detail the agitator or impeller 36 supported by the shaft 32 within the chamber 22, (FIGS. 2 and 3), such impeller 36 preferably comprises a circular, cylindrical body provided with a central opening 85 in which the inner end of the shaft 32 is snugly but slideably receivable. The impeller 36 is prevented from axially inward movement off the end of the shaft 32 and toward the membrane by a pin 86 which extends through and radially outwardly beyond a diametrical hole through the shaft 32 adjacent its inner end, the pin being received in a groove indicated in broken lines at 87 in the axially inner face of the impeller 36. A coil spring 88 snugly surrounds the shaft 32 and bears at its ends upon the inner end of the boss 38 thereon and upon the radial wall of the recess 89 in the axially outer face of the impeller 36 for resiliently urging the impeller against the pin 86 and thus for fixedly axially locating the impeller 36 on the shaft 32 and within the chamber 22.

As discussed hereinabove, it is desired that the volume of the portion of the chamber 22 occupied by donor liquid be minimized with respect to the effective area of the membrane 54 so as to enhance the sensitivity of the diffusion cell 20 and it is further desired that the thickness of the portion of the donor liquid adjacent the membrane be closely controlled and relatively small. These objectives are met by providing an agitator or impeller 36 of a size and shape such that the surface of the agitator facing the membrane 54 will be at a desired distance from the membrane, which may in certain cases be the minimum distance permitted by mechanical considerations and such that the volume of the agitator will leave unoccupied the desired volume within the chamber in relationship to the effective area of the membrane 54. If desired, agitators having similar or different characteristics, according to the work to be performed may be applied to the shaft 32.

In the particular embodiment shown, these objectives are met by providing an agitator 36 of diameter approaching that of the chamber 22, the clearance therebetween being small compared to the diameter of the chamber. In addition, the face of the agitator 36 opposed to the membrane 54 is preferably, except in the particular embodiment shown for the slot 87 planar and radial so that the layer of liquid between the agitator 36 and membrane 54 is of uniform thickness. Again, to minimize the effective volume to membrane surface area ratio, the axial end of the impeller 36 is disposed closely adjacent the closed end of the chamber 22 with very little space being provided therebetween.

Figure 3:
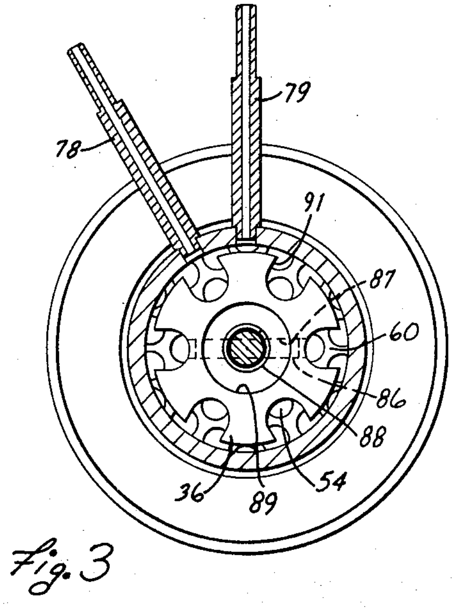
FIG. 3 is a sectional view taken on the line III—III of FIG. 2.

Although it is contemplated that in certain instances sufficient agitation might be provided by an agitator having smooth, circular periphery, the agitator 36 is preferably axially slotted, as indicated at 91 in FIG. 3, or otherwise formed with a circumferentially irregular contour to assist in the agitation of liquid within said chamber 12. However, any such irregularities are preferably aligned parallel to the axis of the shaft 17 so that the motion of liquid within said cell in response to rotation of the agitator 36 will be entirely or substantially entirely parallel to the plane of the membrane 54. A pumping action, which would result if the agitator were slotted or vaned angularly to its rotational axis, would produce erratic flow within the chamber 22 with liquid motion components transverse to the membrane 54 and this, while useable for some conditions, is not preferred for the optimum operation of the system 10.

Likewise projections could be applied to the surface of the agitator facing the membrane for increasing the agitation with respect thereto but such projections, while undoubtedly improving the agitation, would also create irregularities in the flow, including liquid motion components transverse to the membrane, and would thus diminish the reproduceability of the results obtained by the use of this device. Thus, the preferred construction for the agitator 36 is shown, namely one having a substantially planar surface parallel and close to the surface of said membrane and a generally cylindrical peripheral surface positioned perpendicularly to said planar surface and being broken only by a series of slots which are arranged generally parallel to the axis of said shaft.

The agitator 36 may be machined or molded from a moisture resistant, chemically inert material such as delrin, teflon or the like. The agitator 36 is precisely made so that its volume is known within relatively small tolerances as is its position on its supporting shaft 32. The bearing 31 for the shaft 32 is likewise accurately arranged to maintain the axis of said shaft as nearly perpendicular as possible to the plane of the membrane 54. The stirrer or agitator 36 should run as closely as possible, within ordinary mechanical limitations, to the desired distance from the adjacent surface of said membrane in order that the thickness of the diffusion layer will be both minimized to the desired extent and held constant, within as close limits as mechanically feasible.

Similarly, there is preferably provided a stirrer or agitator 93 on the other side of the membrane 54, in the acceptor chamber 22A, which is essentially similar to and may be identical with, the stirrer 36 in the donor chamber 22 and is likewise arranged to run close and parallel to the adjacent face of the membrane 54. The agitator 93 is preferably secured to its shaft 32A in the same manner, described above, as the agitator 36 is fastened to the shaft 32.

In the particular embodiment shown, however, the agitator 93 differs somewhat from the agitator 36. More particularly, the agitator 93 is here provided with a circumferential groove 95. The groove 95 is located on the agitator 93 directly opposite the inlet and outlet conduits 81 and 82 and extends downwardly into and is in communication with the axial slots 91A. The circumferential groove 95 facilitates sampling of acceptor liquid by insertion of a syringe cannula through either of the conduits 81 and 82 thereinto.

Also, to compensate for the volume of the circumferential groove 95 and thus maintain the volume of the chamber 22A available for acceptor liquid the same as in the chamber 22, the agitator 93 is preferably provided with an axially outwardly extending annular flange 96 which extends toward and may extend partially into the annular chamber space outboard of the retainer plate 41A.

As generally indicated above, the cell 21 may utilize the agitators 36 and 93 as shown or the placement of such agitators may be reversed. Alternatively, both agitators, and the donor and acceptor chambers 22 and 22A, may be identical to each other and/or to either of the agitators 36 and 93 shown or if desired either one or both of the chambers 22 and 22A may under certain circumstances omit provision of an agitator. However, the preferred mode of the invention is that shown in FIG. 2.

If desired, switch box 99 may be mounted on the upright plate 64 above the motor 13. In the particular embodiment shown, the switch box 99 includes a switch 100 for controlling the flow of electrical current from a source (not shown) through a separable connector 101 and cable 102 to the motor 113. An indicator lamp 104 is preferably provided on a front face of the switch box 99 and connected to the output side of the switch 100 in such a manner as to indicate when the motor 13 is operating.

OPERATION

A cycle of use may be considered as starting with the housings 21 and 21A separated. The backing disk, if used, may be placed in its recess 58. The seal 50 is placed in its receiving grooves 57 and the membrane 54 is placed substantially coaxially and in overlapping relation therewith on either one of the flanges 46 and 47. The housings are then placed coaxially together, under the guidance of the guide pins 51 and notches 52, to grip the seal 56 and membrane 54 therebetween and the nut 48 is tightened to complete the clamping of said flanges 46 and 47 snugly together with the seal 56 and membrane 54 gripped tightly therebetween.

The assembled diffusion cell 20 is then dropped into the notches 17 and 18 with the housings 21 and 21A positioned to be received by said notches in nonrotatable relationship with the brackets 14 and 16. This automatically meshes the gears 33 and 33A with the gears 75 and 76 and the system is ready to operate.

Upon energization by the switch 100, the motor 13 will act through the gears 64, 76, 75, 33A and 33 to drive the agitator or agitators, such as agitators 36 and 93, as desired. At the same time, donor liquid containing the desired substances to be transferred may be introduced through the conduit 78 into the chamber 22.

The donor liquid may be continuously circulated through the donor chamber 22 or the donor chamber may be filled therewith and if desired a connecting tube (not shown) may be used to join the inlet and outlet conduits 78 and 79. Similarly, the outlet or acceptor chamber 22 is connected via the conduits 81 and 82 to a source of acceptor liquid, the chamber 22A being filled thereby and then either left in connection with the acceptor liquid source or being disconnected therefrom as desired. Material passing through the membrane 24 is withdrawn with the acceptor liquid from the chamber 22A through the conduit 82 for further analysis or processing as desired.

When the diffusion operation is completed, the entire diffusion cell 20 may be withdrawn bodily from its operating position merely by manually lifting same out from the notches 17 and 18, any connections to the conduits 78, 79, 81 and 82 may be removed and the cell 20 may then be dismantled by reversing the process above outlined for assembling same.

By maintaining a suitable liquid, usually water, bath within the receptacle 11, the entire diffusion cell 20 may be held at a desired temperature within very close limits. Said temperature will normally be constant but may if desired be varied by circulating the water within the receptacle 11 and controllably varying the temperature thereof. Since the diffusion cell 20 is normally made of metal it will quickly follow temperature variations of the liquid within the receptacle 11.

It will be noted, however, that although as above mentioned the diffusion cell 20, and particularly the housings 21 and 21A, are normally of metal, they are of such shape and size as lend themselves well to making from plastic material. Accordingly, if the circumstances of the work to be done by the cell 20 are such that metal is undesirable, (for example if it is desired that the interior of the housings 21 and 21A be thermally isolated from the exterior thereof), said housings may be made of whatever plastic material is appropriate for the purposes in question.

It may also be observed that, while an advantage of the invention is in the ease by which the agitators are driven at a selected speed ratio with respect to each other, it is also relatively simple to drive each thereof independently of the other by any convenient means, such as by separate motors having variable speed capacities, or such as variable speed electric or fluid motors, with the speeds of the respective agitators then selected and controlled as desired.

Thus, it will be observed that while the apparatus herein set forth is capable of a wide range of variations and modifications, it is in any given mode capable of extremely accurate operation and will produce results within a high level of precision and reproduceability.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In a diffusion cell system, the combination comprising:

housing means having opposed end walls and defining a generally cylindrical opening extending between said opposed end walls and clamp means associated with said housing means for holding a membrane in a position spaced between said end walls to divide said opening into first and second diffusion chambers;

a rotatable shaft projecting through one of said end walls into the corresponding one of said chambers and having its axis positioned perpendicularly to the plane defined by said membrane when said membrane is in operating position within said clamp means; and an agitator on said shaft having a substantially planar surface adjacent to and parallel with said plane, said agitator having peripheral and outer end surfaces disposed near the perimeter of said chamber and said one end wall, respectively.

2. The device of claim 1 wherein said agitator is of generally cylindrical shape including a series of slots through at least a portion of its circumferential surface which slots are arranged parallel with the axis of said shaft.

3. The device of claim 2 wherein said slots project through said surface of said agitator which is adjacent said first-mentioned plane.

4. The device of claim 3 wherein said surface of said agitator defines an unbroken plane excepting for interruptions thereto provided by said slots.

5. The device of claim 1 having a second shaft rotatably mounted within said housing for projecting into said second chamber and having an agitator thereon likewise positioned close to and when rotating defining a plane parallel with the adjacent surface of said membrane, said first and second shafts being coaxial.

6. The device of claim 1 in which said housing means comprises two cup-shaped housings having the open ends thereof opposed to each other, said membrane being disposed between said opposed ends of said housings, one of said housings being externally threaded, and further including an internally threaded ring receivable over said housings for clamping said housings against said membrane to sandwich the latter therebetween and effecting a uniform clamping force throughout the periphery of said membrane.

7. A diffusion cell system comprising in combination:

a receptacle adapted to hold a temperature controlling fluid;

a pair of brackets within said receptacle;

driving means and a gear system;

at least one gear and a first shaft mounted for rotation about an axis fixed with respect to said brackets, said one gear being drivable by said gear system;

housing means defining a hollow chamber and adapted for holding a membrane therein for dividing said chamber into first and second diffusion chambers, a second shaft extending into at least one of said diffusion chambers and positioned for rotation about an axis arranged perpendicularly to said membrane when same is in operating position and an agitator on said second shaft;

driven gear means fixed to said shaft for rotation therewith;

said housing means having a mating relationship with said brackets whereby said housing may be manually dropped into or withdrawn from said brackets with said driven gear meshing with said one gear when said housing is received into said brackets; and whereby said diffusion cell system may be readily placed into and removed from operating position within a temperature control fluid in said receptacle.

8. The device of claim 7, wherein said housing has a pair of noncircular portions thereon and said brackets have recesses for engaging said noncircular portions in nonrotating relationship therewith whereby said housing means can be manually dropped into or lifted out from said bracket without the necessity for manipulating releasable parts.

9. In a diffusion cell system, the combination comprising:

means including a membrane defining first and second diffusion chambers, said membrane separating said first chamber from said second chamber;

a shaft extending through a wall of one of said chambers with the axis of said shaft being positioned perpendicularly to the plane of said membrane;

an agitator on said shaft having surface means opposed to said membrane and defining, as said agitator rotates, a plane close spaced and parallel to said membrane for controlling the thickness and configuration of the diffusion layer at said membrane, in which said surface means comprises the end surface of said agitator closest to the membrane, said end surface being of diameter closely approaching that of said membrane so as to control diffusion layer thickness substantially across the entire face of the membrane and cause said diffusion layer to be substantially constant in shape.

10. The device of claim 9, in which said end surface is substantially radially planar and positively located with respect to said membrane providing a substantially disk shaped space between said membrane and agitator for causing diffusion liquid to pass across the membrane in a uniform manner and substantially avoid axial movement of diffusion liquid by said agitator.

11. The device of claim 9, in which said chamber and agitator are substantially cylindrical and are of substantially circular cross section, said agitator having a peripheral wall including axial slots for circumferential agitation of diffusion liquid in contact therewith and avoiding axial agitation.

12. In a diffusion cell system, the combination comprising:

means including a membrane defining first and second diffusion chambers, said membrane separating said first chamber from said second chamber;

a shaft extending through a wall of one of said chambers with the axis of said shaft being positioned perpendicularly to the plane of said membrane;

an agitator on said shaft having surface means opposed to said membrane and defining, as said agitator rotates, a plane close spaced and parallel to said membrane for controlling the thickness and configuration of the diffusion layer at said membrane, in which said agitator conforms closely in size and shape to said one chamber and makes relatively small the volume left in said one chamber for diffusion liquid, providing a high membrane surface area to chamber volume ratio for maximizing cell sensitivity.

13. In a diffusion cell system, the combination comprising:

means including a membrane defining first and second diffusion chambers, said membrane separating said first chamber from said second chamber;

a shaft extending through a wall of one of said chambers with the axis of said shaft being positioned perpendicularly to the plane of said membrane;

an agitator on said shaft having surface means opposed to said membrane and defining, as said agitator rotates, a plane close spaced and parallel to said membrane for controlling the thickness and configuration of the diffusion layer at said membrane;

an upwardly opening receptacle adapted to hold a temperature controlling fluid, said means defining first and second diffusion chambers comprising an elongate, cylindrical and substantially horizontal housing, said first and second diffusion chambers being at opposite ends of said housing, brackets within the receptacle for supporting the ends of said housing for at least partial housing immersion in such temperature controlling fluid, bearing and seal means in the end wall of said one chamber for receiving said shaft therethrough, said shaft extending into said receptacle for being rotatably driven, and immersible in such temperature controlling fluid.

14. The device of claim 13, including inlet and outlet conduits for diffusion liquid communicating through the peripheral wall of said housing at least with said one chamber and axially spaced from said membrane, said conduits being closely circumferentially spaced on said housing and extending substantially upwardly therefrom toward the open top of said receptacle.

15. The device of claim 13, including a second shaft and a second agitator mounted thereon and located in the other of said chambers, liquid inlet and outlet conduits communicating through the peripheral wall of said housing with said other chamber in laterally opposed relation to an axially intermediate portion of said second agitator, said second agitator having a circumferential groove opposed to said inlet and outlet conduits.

16. The device of claim 13, including a cover removably locatable on top of said receptacle, a drive motor and control means therefore mounted on and above said cover and means defining a drive train connecting said motor and said shaft, said drive train having drivingly engagable but freely separable portions to avoid interference by said drive train with removal of said cover from said receptacle.

* * * * *